(12) United States Patent
Ganapathi et al.

(10) Patent No.: US 8,994,790 B2
(45) Date of Patent: Mar. 31, 2015

(54) MOTION CAPTURE WITH LOW INPUT DATA CONSTRAINTS

(75) Inventors: Hariraam Varun Ganapathi, Palo Alto, CA (US); Christian Theobalt, Stanford, CA (US); Sebastian Thrun, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 552 days.

(21) Appl. No.: 12/712,901

(22) Filed: Feb. 25, 2010

(65) Prior Publication Data

US 2011/0205337 A1 Aug. 25, 2011

(51) Int. Cl.
*H04N 13/02* (2006.01)
*G06K 9/00* (2006.01)
*G06T 7/20* (2006.01)

(52) U.S. Cl.
CPC .......... *G06K 9/00342* (2013.01); *G06T 7/2046* (2013.01); *G06T 7/208* (2013.01); *G06T 2200/28* (2013.01); *G06T 2207/10028* (2013.01); *G06T 2207/20076* (2013.01); *G06T 2207/30196* (2013.01)
USPC .............................. 348/46; 382/106; 382/203

(58) Field of Classification Search
CPC .. G06K 9/00342; G06K 9/46; G06T 2200/28; G06T 2207/10028; G06T 2207/20076; G06T 2207/30196; G06T 7/2046; G06T 7/208; H04N 13/02
USPC ...................... 348/E13.074, 46; 382/106, 203
See application file for complete search history.

(56) References Cited

U.S. PATENT DOCUMENTS

| 6,084,979 | A  | * | 7/2000 | Kanade et al. ................. 382/154 |
| 6,115,052 | A  |   | 9/2000 | Freeman et al. |
| 6,269,172 | B1 |   | 7/2001 | Rehg et al. |
| 6,674,877 | B1 |   | 1/2004 | Jojic et al. |
| 7,986,828 | B2 |   | 7/2011 | Rao et al. |
| 2002/0145607 | A1 |   | 10/2002 | Dimsdale |
| 2003/0197712 | A1 |   | 10/2003 | Dantwala |
| 2004/0252862 | A1 | * | 12/2004 | Camus et al. ................. 382/104 |
| 2006/0251298 | A1 |   | 11/2006 | Bronstein et al. |
| 2007/0263907 | A1 |   | 11/2007 | McMakin et al. |
| 2007/0299559 | A1 |   | 12/2007 | Janssen et al. |
| 2008/0031512 | A1 | * | 2/2008 | Mundermann et al. ....... 382/154 |

(Continued)

OTHER PUBLICATIONS

R.H. Byrd, L. Peihuang, J. Nocedal, and Z. Ciyou, "*A Limited Memory Algorithm for Bound Constrained Optimization*," SIAM Journal of Scient. Computing, vol. 16, No. 5 (1995). Abstract only.

(Continued)

*Primary Examiner* — Sath V Perungavoor
*Assistant Examiner* — Dakshesh Parikh
(74) *Attorney, Agent, or Firm* — Crawford Maunu PLLC (57) ABSTRACT

Systems, devices, methods and arrangements are implemented in a variety of embodiments to facilitate motion capture of objects. Consistent with one such system, three-dimensional representations are determined for at least one object. Depth-based image data is used in the system, which includes a processing circuit configured and arranged to render a plurality of orientations for at least one object. Orientations from the plurality of orientations are assessed against the depth-based image data. An orientation is selected from the plurality of orientations as a function of the assessment of orientations from the plurality of orientations.

19 Claims, 8 Drawing Sheets

(56) References Cited

U.S. PATENT DOCUMENTS

| | | | |
|---|---|---|---|
| 2008/0100622 A1 | 5/2008 | Gordon | |
| 2008/0180448 A1* | 7/2008 | Anguelov et al. | 345/475 |
| 2008/0309664 A1* | 12/2008 | Zhou et al. | 345/420 |
| 2009/0027402 A1* | 1/2009 | Bakalash et al. | 345/505 |
| 2009/0135190 A1* | 5/2009 | Bakalash et al. | 345/506 |
| 2009/0284529 A1* | 11/2009 | De Aguiar et al. | 345/420 |
| 2010/0195869 A1* | 8/2010 | Geiss | 382/103 |
| 2010/0197399 A1* | 8/2010 | Geiss | 463/32 |

OTHER PUBLICATIONS

T. Kanade, P. Rander, and P.J. Narayanan, "*Virtualized Reality: Constructing Virtual Worlds from Real Scenes*," IEEE MultiMedia 4, 1, pp. 34-37 (1997).

D.G. Lowe, "*Object Recognition From Local Scale-Invariant Features*," In Proc. ICCV, vol. 2, pp. 1-8 (1999).

W. Matusik, "*Image-Based Visual Hulls*," Mass. Inst. of Technology 2001 pp. 1-87 (2001).

B. Allen, B. Curless, and Z. Popović, "*Articulated Body Deformation from Range Scan Data*," ACM Trans. Graph 21, 3, pp. 612-619 (2002).

M. Muller, J. Dorsey, L. McMillan, R. Jangnow, and B. Cutler, "*Stable Real-Time Deformation*," In Proc.of SCA, ACM, 49-54 (2002).

M. Gross, S. Würmlin, M. Naef, E. Lamboray, C. Spagno, A. Kunz, E. Koller-Meier, T. Svoboda, L.V. Gool, S. Lang, K. Strehlke, A.V. Moere, and O. Staadt, "*Blue-C: A Spatially Immersive Display and 3D Video Portal for Telepresence*," ACM TOG 22, 3, pp. 819-827 (2003).

P. Sand, L. McMillan, and J. Popović, "*Continuous Capture of Skin Deformation*," ACM TOG 22, 3, pp. 578-586 (2003).

J. Carranza, C. Theobalt, M. Magnor, and H.-P Seidel, "*Free-Viewpoint Video of Human Actors*," ACM Transactions on Graphics, vol. 22, No. 3, pp. 569-577 (Jul. 2003).

R. Sumner and J. Popović, "*Deformation Transfer for Triangle Meshes*," In SIGGRAPH '04, pp. 399-405 (2004).

C.L. Zitnick, S.B. Kang, M. Uyttendaele, S. Winder, and R. Szeliski, "*High-Quality Video View Interpolation Using a Layered Representation*," ACM TOG 23, 3, pp. 600-608 (2004).

V. Scholz, T. Stich, M. Magnor, M. Keckeisen, and M. Wacker, "*Garment Motion Capture Using Color-Coded Patterns*," Computer Graphics Forum (Proc. Eurographics EG '05) 24, 3 (Aug.), pp. 439-448 (2005).

B. Wilburn, N. Joshi, V. Vaish, E.-V. Talvala, E. Antunez, A. Barth, A. Adams, M. Horowitz, and M. Levoy, "*High Performance Imaging Using Large Camera Arrays*," ACM TOG 24, 3, pp. 765-776 (2005).

S. Vedula, S. Baker, and T. Kanade, "*Image-Based Spatio-Temporal Modeling and View Interpolation of Dynamic Events*," ACM Trans. Graph. 24, 2, pp. 240-261 (2005).

M. Leordeanu and M. Hebert, "*A Spectral Technique for Correspondence Problems Using Pairwise Constraints*," Computer Vision, ICCV 2005, Tenth IEEE International Conf., vol. 2, pp. 1482-1489 (Oct. 2005).

H. Yamauchi, S. Gumhold, R. Zayer, and H.-P. Seidel, "*Mesh Segmentation Driven by Gaussian Curvature*,"Visual Computer, vol. 21, Nos. 8-10, pp. 659-668 (Sep. 2005).

D. Anguelov, P. Srinivasan, D. Koller, S. Thrun, and J. Rodgers, "*SCAPE: Shape Completion and Animation of People*," ACM Transactions on Graphics (TOG), vol. 24, Issue 3, 9 pgs. (Jul. 2005).

S.I. Park, and J.K Hodgins, "*Capturing and Animating Skin Deformation In Human Motion*," ACM TOG (SIGGRAPH 2006) 25, 3 (Aug.).

B. Rosenhahn, U. Kersting, K. Powel, and H.-P Seidel, "*Cloth X-Ray: Mocap of People Wearing Textiles*," In LNCS 4174: Proc. DAGM, pp. 495-504 (2006).

S. Seitz, B. Curless, J. Diebel, D. Scharstein, and R. Szeliski, "*A Comparison and Evaluation of Multi-View Stereo Reconstruction Algorithms*," Proceed. of the 2006 IEEE Computer Society Conf. on Computer Vision and Pattern Recognition, pp. 519-528 (2006).

M. Goesele, B. Curless, and S. Seitz, "*Multiview Stereo Revisited*," Computer Vision and Pattern Recognition, IEEE Computer Society Conference, vol. 2, pp. 2402-2409 (2006).

M. Kazhdan, M. Bolitho, and H. Hopee, "*Poisson Surface Reconstruction*," Eurographics Symposium on Geometry Processing, 10 pgs. (2006).

P. Einarsson, C.-F Chabert, A. Jones, W.-C. Ma, B. Lamond, T. Hawkins, M. Bolas, S. Sylvan, and P. Debevec, "*Relighting Human Locomotions with Flowed Reflectance Fields*," In Proc. EGSR, pp. 183-194 (2006).

T. Moeslund, A. Hilton, and V. Krüger, "*A Survey of Advances in Vision-Based Human Motion Capture and Analysis*," Comput. Vis. Image Underst. 104, 2, pp. 90-126 (2006).

C. Stoll, Z. Karni, C. Rössi, H.Yamauchi, and H.-P. Seidel, "*Template Deformation for Point Cloud Fitting*," Eurographics Symposium on Point-Based Graphics, 9 pgs. (2006).

O. Sorkine and M. Alexas, "*As-rigid-as possible surface modeling*,"Eurographics Symposium on Geometry Processing, 8 pgs. (2007).

R. White, K. Crane, and D.A. Forsyth, "*Capturing and Animating Occluded Cloth*," In ACM TOG (Proc. SIGGRAPH), 8 pgs. (2007).

N. Mitra, S. Flöry, M. Ovsjanikov, N. Gelfand, L. Guibas, and H. Pottmann, "*Dynamic Geometry Registration*," Eurographics Symposium on Geometry Processing, pp. 173-182 (2007).

W. Xu, K. Zhou, Y. Yu, Q. Tan, Q. Peng, and B. Guo, "*Gradient Domain Editing of Deforming Mesh Sequences*," In Prod. SIGGRAPH, ACM, 10 pgs. (2007).

E. de Aguiar, C. Theobalt, C. Stoll, and H.-P. Seidel,, "*Marker-Less 3D Feature Tracking for Mesh-Based Human Motion Capture*," In 2nd Workshop on Human Motion. ICCV'07, Rio de Janeiro, Brazil, pp. 1-15 (2007).

B. Bickel, M. Botsch, R. Angst, W. Matusik, M. Otaduy, and H. Pfister, "*Multi-Scale Capture of Facial Geometry and Motion*," In Proc. of SIGGRAPH 33, vol. 26, Issue 3, 10 pgs. (Jul. 2007).

M, Wang, P. Jenke, Q. Huang, M. Bokeloh, L. Guibas, and A. Schilling, "*Reconstruction of Deforming Geometry from Time-Varying Point Clouds*," In Proc. SGP, 49-58 (2007).

J. Starck and A. Hilton, "*Surface Capture for Performance-Based Animation*," IEEE CGAA 27(3), 23 pgs (2007).

R. Poppe, "*Vision-Based Human Motion Analysis: An Overview*," CVIU 108, pp. 4-18 (2007).

E. de Aguiar, C. Theorbalt, S. Thrun, and H.-P Seidel, "*Automatic Conversion of Mesh Animations Into Skeleton Based Animations*," Computer Graphics Forum (Proc. Eurographics EG 08) 27, 2 (4) pp. 389-397 (2008).

M. Botsch and O. Sorkine, "*On Linear Variational Surface Deformation Methods*," IEEE Transactions on Visualization and Computer Graphics, vol. 14, Issue 1, pp. 213-230 (Jan. 2008).

E. de Aguiar, C. Stoll, N. Ahmed, C. Theobalt, H.-P. Seidel, and S. Thrun, "*Performance Capture From Sparse Multi-View Video*," Int'l Conference on Computer Graphics and Interactive Techniques, No. 98, pp. 1-10 (2008).

M. Segal and K. Akeley, "*The OpenGL® Graphics System: A Specification*," version 3.2, Core Profile—Jul. 24, 2009.

Parikh et al. "Feature-based Part Retrieval for Interactive 3D Reassembly." Applications of Computer Vision, WACV '07 Conference, Carnegie Mellon University, 6 pgs. (Feb. 2007).

\* cited by examiner

MOTION CAPTURE WITH LOW INPUT DATA CONSTRAINTS

FEDERALLY-SPONSORED RESEARCH OR DEVELOPMENT

This invention was made with Government support under contract N00014-07-1-0747 awarded by the Department of the Navy ONR. The Government has certain rights in this invention.

FIELD

Aspects of the present disclosure relate to the field of motion capture and to algorithms and systems that facilitate the capture of a subject, such as by tracking and recording humans, animals and other objects in motion, including deformable objects.

BACKGROUND

Three-dimensional modeling of structures by a computer can be useful for a wide range of applications. Common applications relate to the generation of virtual structures to produce a visual display that depicts the structure. For example, video games often generate in-game characters using virtual models that recreate the motions of real-world actors, athletes, animals or other structures. Similar efforts are often undertaken for computer-generated characters in movies, television shows and other visual displays. The useful applications span areas as diverse as medicine, activity recognition, and entertainment. As robots become more commonplace in settings that include humans, they will need the ability to recognize human physical action.

Increasingly, the virtual modeling is moving away from the creation of a cartoon style appearance to more of a photo-realistic display of the virtual sets and actors. It can still take a tremendous effort to create authentic virtual doubles of real-world actors. Creation of a model that captures the muscle, joint, neurological and other intricacies of the human body is a prohibitively difficult proposition due to the sheer number of factors involved. Thus, modeling of a person is often implemented using motion capture of a real-world person. While in recent years, algorithms have been proposed that capture full skeletal motion at near real-time frame rates, they mostly rely on multi-view camera systems and specially controlled recording conditions which limits their applicability. It remains one of the biggest challenges to capture human performances, i.e., motion and possibly dynamic geometry of actors in the real world in order to map them onto virtual doubles.

SUMMARY

Aspects of the present disclosure are directed to overcoming the above-mentioned challenges and others related to the types of applications discussed above and in other applications. These and other aspects of the present disclosure are exemplified in a number of illustrated implementations and applications, some of which are shown in the figures and characterized in the claims section that follows.

Aspects of the present disclosure are directed towards a system for generating three-dimensional representations for at least one object. Depth-based image data is used in the system, which includes a processing circuit configured and arranged to render a plurality of orientations for at least one object. Orientations from the plurality of orientations are assessed against the depth-based image data. An orientation is selected from the plurality of orientations as a function of the assessment of orientations from the plurality of orientations.

Consistent with embodiments of the present disclosure, a system is implemented that includes a data input for receiving the depth-based image data for a scene that includes the at least one object. A parallel processing unit includes a graphical processing unit configured to score and select a proposed three-dimensional object orientation by rasterizing a first proposed three-dimensional object orientation to provide a two-dimensional set of fragments; performing occlusion analysis of the two-dimensional set of fragments to provide a two-dimensional set of pixels; rendering, for pixels of the two-dimensional set of pixels, depth values corresponding to the three-dimensional object orientation; comparing the rendered depth values to a stored set of depth values; producing a first score for the first proposed three-dimensional object orientation as a function of comparison of the rendered depth values to depth image data received on the data input; repeating, for a second proposed three-dimensional object orientation, the steps of rasterizing, performing, rendering, comparing and producing, wherein the repeated step of producing is implemented to produce a second score; and selecting between the first proposed three-dimensional object orientation and the second proposed three-dimensional object orientation as a function of the first score and the second score.

Embodiments of the present disclosure are directed toward a method that provides motion capture of a structure using parallel processing hardware. A processing circuit is used to render a plurality of poses for the structure; assess poses of the plurality of poses against the depth-based image data; and select a pose from the plurality of poses as a function of the assessment of each of the plurality of poses.

Consistent with implementations of the present disclosure, a method is implemented that includes the steps of accessing, in a memory local to the parallel processing hardware, a plurality of relative moves for a three dimensional model of a structure, the relative moves describing movement of the structure about one or more joints; accessing, in a memory local to the processing hardware, two-dimensional input pixel data that includes depth values for pixels of the two-dimensional pixel data; rasterizing, within the parallel processing hardware, a set of two-dimensional pixel representations based upon the three dimensional model and a first subset set of moves of the plurality of relative moves; comparing depth values for the subset of two-dimensional pixel representations to the depth values for the two-dimensional input pixel data; selecting a first move in response to the depth comparison; selecting a second subset of moves as a function of the first selected move; repeating the steps of rasterizing and comparing for the second subset of moves; and selecting a second move from the second subset of moves in response to the repeated steps.

Embodiments of the present disclosure also relate to a method for providing motion capture of a structure using parallel processing hardware. The method includes accessing, in a memory local to the parallel processing hardware, a plurality of relative moves for a three dimensional model of a structure, the relative moves describing movement of the structure about a plurality of joints; accessing, in a memory local to the processing hardware, two-dimensional input pixel data that includes depth values for pixels of the two-dimensional pixel data; rasterizing, within the parallel processing hardware, a set of two-dimensional pixel representations based upon the three dimensional model and a first subset set of moves of the plurality of relative moves for a first set of joints of the plurality of joints; comparing depth values for the subset of two-dimensional pixel representations to the depth values for the two-dimensional input pixel data; selecting a first move in response to the depth comparison; selecting a second subset of moves as a function of a second set of joints of the plurality of joints; repeating the steps of rasterizing and comparing for the second subset of moves; and selecting a second move from the second subset of moves in response to the repeated steps.

The above summary is not intended to describe each illustrated embodiment or every implementation of the present disclosure.

BRIEF DESCRIPTION OF THE DRAWINGS

The disclosure may be more completely understood in consideration of the detailed description of various embodiments of the disclosure that follows in connection with the accompanying drawings as follows.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

The present disclosure is believed to be useful for capturing and reconstructing movement of images such as video-based performances of real-life subjects, whether human, animal, man-made or otherwise. Specific applications of the present disclosure facilitate reconstruction of motion from a live performance captured by an image sensor. While the present disclosure is not necessarily limited to such applications, various aspects of the disclosure may be appreciated through a discussion of various examples using this context.

According to an embodiment of the present disclosure, motion capture of a structure is provided using image data that includes depth information of the structure and of background objects. A probabilistic model relates the image data to candidate poses of the structure. A search strategy identifies strong dependencies between parameters to choose to either optimize the parameters relatively independently, or to optimize strongly correlated parameters together.

Aspects of the present disclosure relate to the use of skeletal constraints to generate the model. Skeletal constraints include joint-based constraints on movement. These constraints are relaxed and enforced in a certain order. For instance, the constraints can be implemented in a hierarchical order according to various parameters. Further details of such implementations are provided herein.

Consistent with an embodiment of the present disclosure, an active time-of-flight (TOF) depth camera is used to provide the image data. This image data includes (potentially noisy) estimates of the depth at each point in the image. This can be particularly useful for identifying disambiguation between poses that otherwise look very similar in image data. For instance, standard cameras provide a perspective projection of the structure. A depth camera facilitates tracking of out-of-plane rotations, and motion along the viewing directions which are difficult with a single video camera. A probabilistic model can then be used to relate the depth sensor readings to candidate poses of the structure. Finding the most likely pose is a non-convex optimization problem. A search strategy can be employed to optimize assignments to subsets of parameters given other parameters, while relaxing and enforcing the skeleton constraints in a certain order. Strong dependencies can be identified between parameters in the likelihood function. Parameters can be optimized independently in a different approximate function, or together (e.g., for strongly correlated parameters).

Specific implementations relate to such procedures that are tailored for efficient parallelization on a parallel processing system, such as a graphics processing unit (GPU); however, the various aspects can also be implemented serially. For instance, a sufficiently powerful processing circuit can be used to provide multiple image renderings in a serial manner. Moreover, implementations that are not real-time or otherwise lack significant constraints on processing times can involve implementation of some (or all) of the processing steps (e.g., rendering, assessment and other processing) in a serial manner. Accordingly, while the present disclosure sometimes discusses embodiments in the context of a parallel processing hardware, and more specifically a graphics processing unit, the various aspects can be implemented using serial processing and related methodology.

Particular embodiments use a TOF sensor, a robust energy function tailored to the TOF sensor, and a simple and fast optimization strategy to provide monocular full-body pose capture in real-time (or near real-time). Other aspects relate to reliable tracking of the structure.

Embodiments of the present disclosure are particularly useful for providing convenient, cheap, motion capture that can be implemented under relaxed imaging conditions. These and other factors lead to a wide range of applications including, but not limited to, smart surveillance, identification, control, character animation, virtual reality and motion analysis. Implementations of the present disclosure can be used in a variety of other applications. For instance, additional applications may become apparent in response to new technology becoming available.

Aspects of the present disclosure relate to correlating sensor-received image data to a set of candidate poses for the structure. A scoring/assessment algorithm evaluates candidate poses using a comparison to the image data. The candidate poses generate expected depth values for the structure. These expected values can be compared against the image data as part of the scoring process. Other parameters can also be included in the scoring process. These can include, for instance, penalties for significant deviations from a previous pose, penalties for unusual/unlikely poses and penalties for collision between portions of the structure. The candidate poses can be generated using a model of the structure that includes various constraints on allowed positions/movements for the structure.

In a particular implementation, the candidate poses are defined according to a set of movable points and associated allowed movement directions and ranges. For instance, a human body can be segmented according to skeletal joints of the body. Certain joints will have different movement constraints, such as one degree of freedom for an elbow joint and additional three degrees of freedom for the neck joint. Together these constraints can be used to form a set of candidate poses for the structure.

Specific implementations relate to parallel assessment of multiple candidate poses using a parallel processing architecture. For instance, many graphics processing units (GPUs) are designed to perform massively parallel operations on image data. Aspects of the present disclosure relate to scoring of candidate poses using a GPU or similar architecture. For instance, each candidate pose can be defined as a set of relative moves for each joint. Candidate moves can therefore be more easily pre-stored on the GPU on a move per joint basis.

Another aspect that can be particularly useful in a parallel processing environment relates to parallel optimization and scoring for multiple poses to ascertain the desired pose. For instance, optimization of poses for one limb without simultaneous consideration of other limbs may result in selection of an overall pose for the structure that is less than optimal.

Embodiments of the present disclosure are directed toward implementation of a hierarchal search strategy. This involves the prioritization of scoring certain portions of the structure over other portions. For instance, candidate poses for the torso and head of a person can be scored first to determine a probable location and orientation thereof. Subsequently, candidate poses for the limbs of the person can be scored using the determined location and orientation as a basis from which the joint constraints are applied. One mechanism for implementing such a hierarchal search strategy involves relaxing some of the constraints while scoring for a prioritized portion of the structure. Thereafter the constraints can be (more) fully applied. This allows for portions of the structure to be optimized relatively independent from other portions.

Embodiments of the present disclosure allow for dynamic selection of the hierarchal order for different structures and situations. For instance, the prioritization can be manually selected by a user of the system. In another instance, multiple prioritization schemes can be tested and the result that provides the best score can be applied.

In an alternate embodiment, captured image data is processed to determine probably locations for parts of the structure. From these probable locations, candidate positions for joint angles are then derived. For instance, using probable locations of the fingers or head, the angles of the various part of the body (e.g., elbow or neck) can be adjusted so as to bring the location of the part according to the pose closer to the guesses.

Figure 1A:
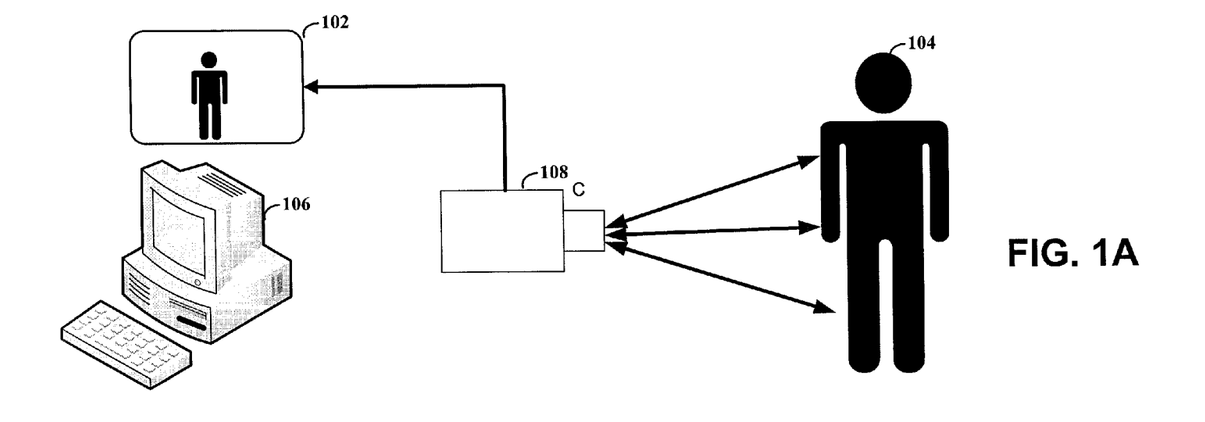
FIG. 1A depicts an image sensor and processor arrangement, consistent with an embodiment of the present disclosure.

Turning now to the figures, FIG. 1A depicts an image sensor and processor arrangement, consistent with an embodiment of the present disclosure. Image sensor 108 captures image data 102, which includes structure 104. The flexibility of various embodiments of the present disclosure facilitates the use of a wide variety of sensors for image sensor 108. In a particular implementation, image sensor 108 is implemented using a time-of-flight sensor arrangement that provides depth measurements for structure 104 and other objects in the field of view.

Structure 104 is shown as a human; however, embodiments of the present disclosure are not so limited. For instance, various embodiments of the present disclosure are particularly well-suited for motion capture of structures for which skeletal modeling is appropriate. Other embodiments are also possible, particularly structures that can be modeled by a reasonable number of candidate poses defined by a set of movement constraints for various portions of the structure.

In specific implementations, image data 102 includes data that can be used to determine depth of objects within the field of view of image sensor 108. This data is provided to a processing device 106. Processing device 106 is depicted as a computer system; however, various processing circuits can be used. Moreover, combinations of multiple computers, hardware logic and software can be used. In a particular implementation, processing device 106 includes a parallel processor, such as a graphics processing unit (GPU). Processing device 106 uses the image data to generate a digital representation of the structure 104 as shown in more detail in FIG. 1B.

Figure 1B:
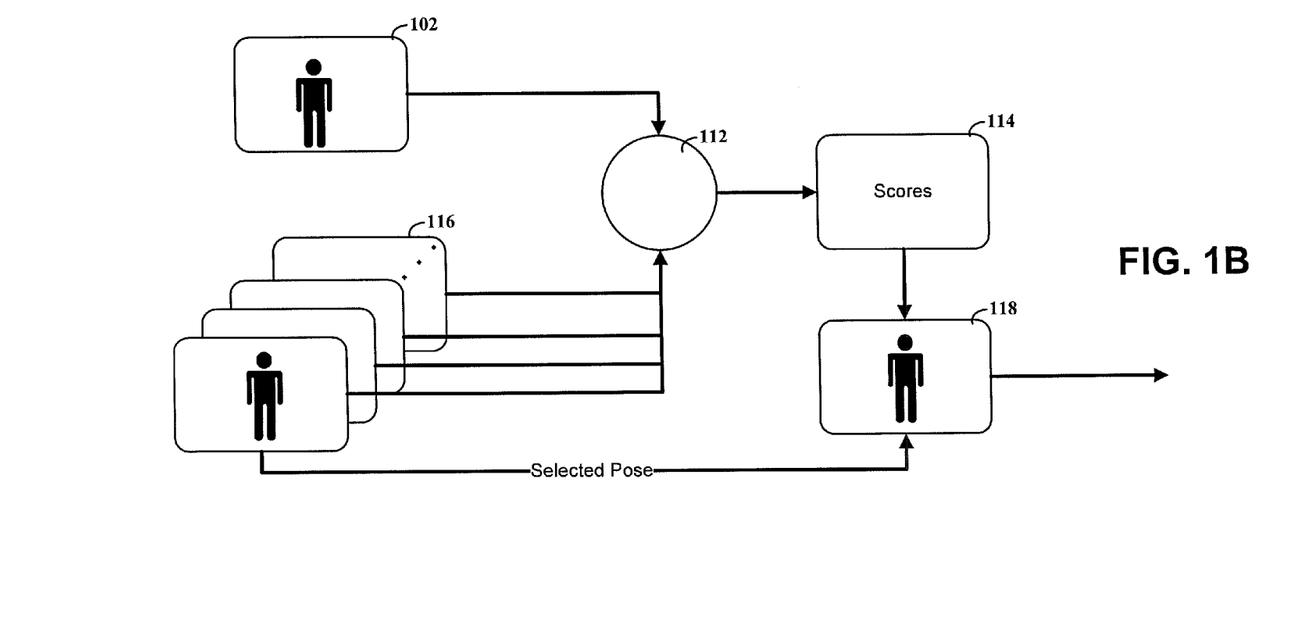
FIG. 1B depicts a flow diagram for generating a motion capture model of a structure, consistent with an embodiment of the present disclosure.

FIG. 1B depicts a flow diagram for generating a motion capture model of a structure, consistent with an embodiment of the present disclosure. Image data 102 is used as a reference for a scoring procedure 112. The scoring procedure involves scoring a plurality of candidate poses 116. The resulting scores 114 are then used as a basis for selecting a pose 118 from the candidate poses. The candidate poses represent possible locations and orientations for a model of the structure being imaged. In this manner, a set of poses can be selected that correspond to series of images.

In one implementation, an articulated model consists of representation of the morphology of a human body's anatomy combined with the skeleton which consists of the kinematic chain and joint centers. Many approximate representations of a human body's morphology have been considered in the tracking literature, including general geometric shapes (e.g., cylinders, quadrics). The kinematic chain inside the mesh, specifically the joint locations, can be determined through manual specification; however, automatic specification can be desirable.

Figure 2A:
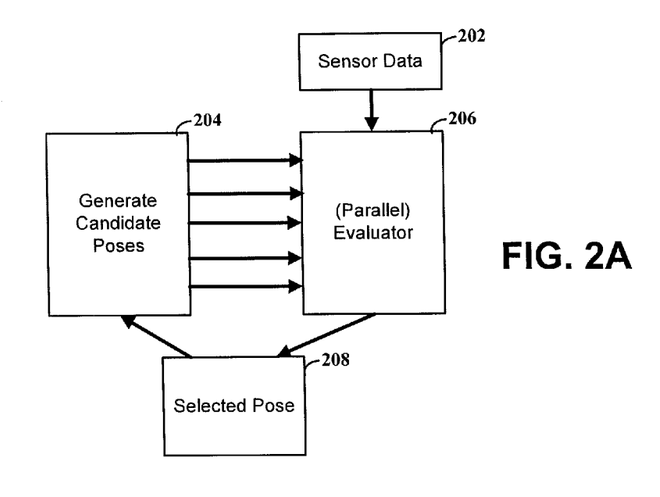
FIG. 2A depicts a flow diagram for generating a model of a structure from image data, consistent with an embodiment of the present disclosure.

FIG. 2A depicts a flow diagram for generating a model of a structure from image data, consistent with an embodiment of the present disclosure. Candidate poses are generated at 204. In a particular implementation, these poses can be represented by a set of moves that can be, at least partially, defined within a set of joint constraints for a skeletal model of the structure. These candidate poses are sent to a parallel evaluator 206. Parallel evaluator 206 scores the set of candidate poses as a function of how well the candidate pose describes the sensor/image data 202 that the model is to track. The scoring is used to define/select a pose 208 from the candidate poses. In some instances, the process can iteratively repeat for additional candidate poses until a suitable pose is found and/or all candidate poses have been assessed.

In a particular implementation, sensor data 202 includes depth information about the scene captured by a sensor. Parallel evaluator 206 compares this depth information to depth information generated by the candidate poses. The resulting score provides an indication of how well a particular candidate pose matches the actual sensor data 202. Other factors that can be included into the score include, but are not limited to penalizing poses as a function of differences from a selected pose from a previous frame, penalizing unusual poses (joint angles near a mean joint angle are preferred) and/or penalizing for self collision of model parts. These penalties can be adjusted, selected or not implemented as a function of the structure being modeled. For instance, when modeling a person the algorithm may penalize candidate motions that exceed known limits of human speed, flexibility or other parameters.

Figure 2B:
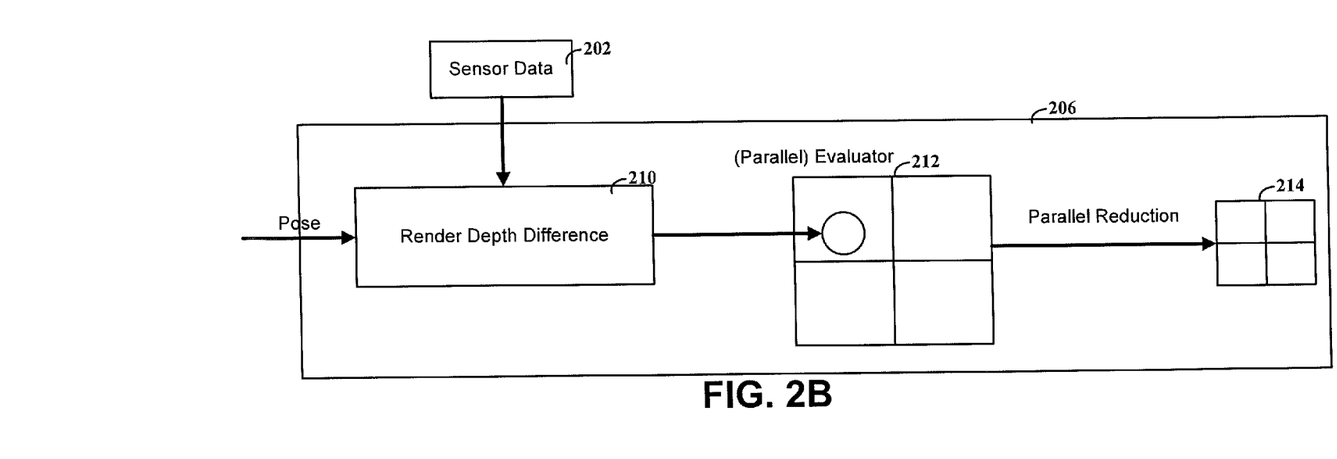
FIG. 2B depicts additional details of a parallel evaluator, consistent with an embodiment of the present disclosure.

FIG. 2B depicts additional details of a parallel evaluator, consistent with an embodiment of the present disclosure. Parallel evaluator 206 is shown with respect to scoring of a single pose; however, the parallel evaluator 206 can be configured to score numerous poses in parallel. Parallel evaluator 206 renders depth differences 210 between a candidate pose and sensor data 202. Generally speaking, the closer/less the difference, the better the score. In a particular implementation, the parallel evaluator generates respective scores for sets of pixels within the image. The resulting scores are then grouped to produce smaller and smaller score sets 214. This parallel reduction process can be repeated until a single score is provided that represents the specific candidate pose.

Aspects of the present disclosure can be particularly useful for using systems designed for parallel processing of large images, such as in a GPU. GPUs are generally designed to perform parallel operations on a set of N×M pixels. Accordingly, one embodiment of the present disclosure relates to scoring of an image of N×M pixels (212) by generating a score for each 2×2 pixel group that makes up the N×M pixel group. The resulting set of scores can be conceptualized as an (N/4)×(M/4) set of pixels (214). This resulting set of scores can then be scored by generating a score for each 2×2 group that makes up the (N/4)×(M/4) set. The parallel reduction process can be iteratively implemented until a single score is left for the candidate pose. This iterative process can be implemented for a large set of candidate poses. The resulting scores for each pose can be stored as a value in an array of N×M scores and provided as an output of the process.

Figure 3:
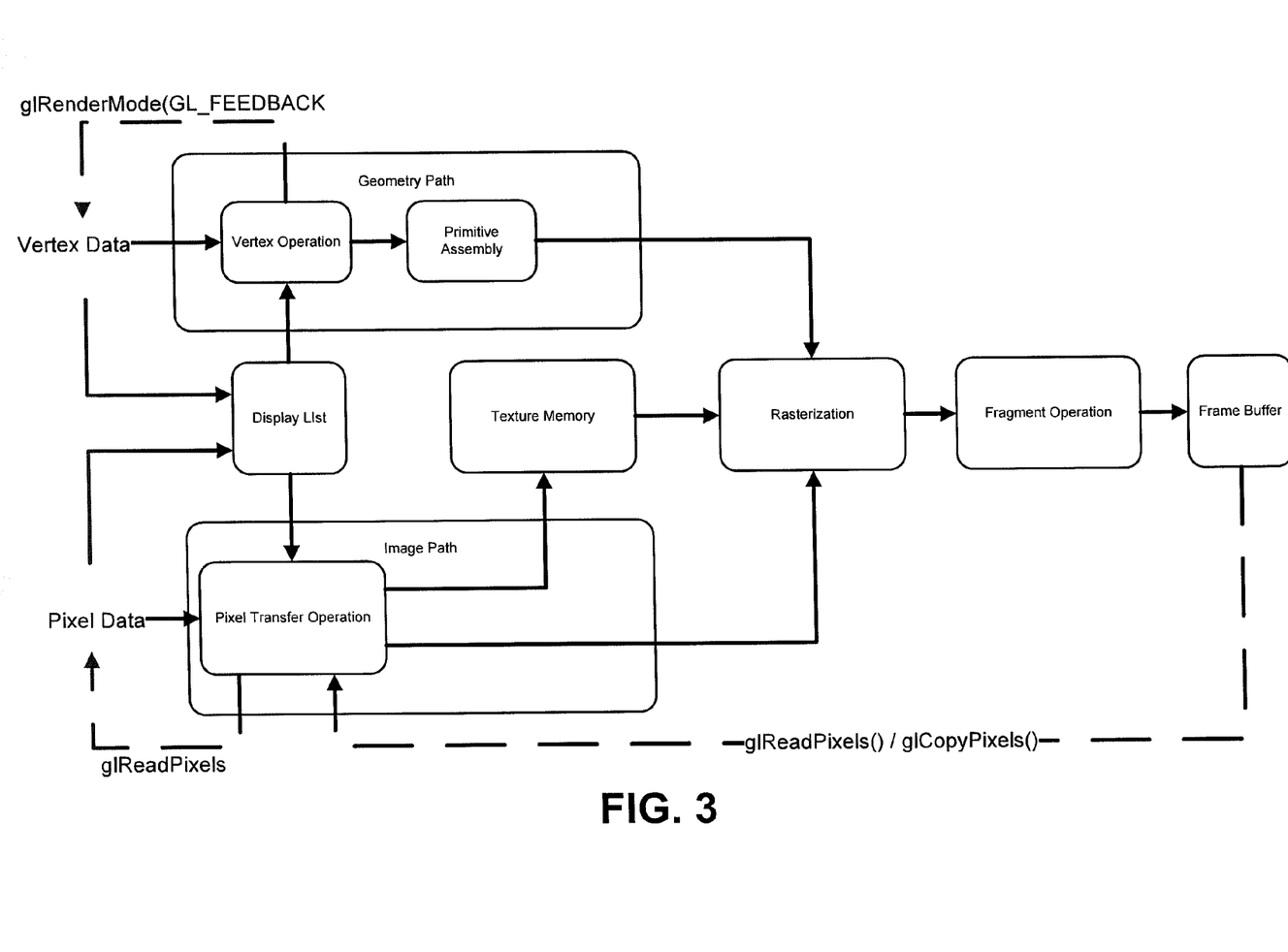
FIG. 3 depicts an implementation associated with parallel processing hardware, consistent with an embodiment of the present disclosure.

FIG. 3 depicts an implementation associated with parallel processing hardware, consistent with an embodiment of the present disclosure. The particular parallel processing hardware depicted is consistent with a graphics processing pipeline and more particularly with an OpenGL graphics pipeline. While particular aspects will be understood in the context of an OpenGL graphics pipeline, embodiments of the disclosure are not necessarily limited to a particular graphics pipeline or even to graphics processors.

In a standard application of a graphics pipeline, the generated image data is formatted according to pixel data for a two-dimensional display screen. In particular implementations of the present disclosure, parallel processing hardware is particularly useful for generating image data for a large number of object/structure poses or orientations. The generated image data includes depth based information. This facilitates assessment of the poses by comparison to actual sensor data from depth-bases sensor, such as a TOF sensor.

Consistent with a specific embodiment of the present disclosure, a system is implemented that includes a data input for receiving depth image data for a scene that includes at least one structure. The system also includes a graphical processing unit (GPU) that is configured to score and select a proposed three-dimensional object orientation. The GPU rasterizes a first proposed three-dimensional object orientation to provide a two-dimensional set of fragments. A two-dimensional set of pixels is provided by performing occlusion analysis of the two-dimensional set of fragments. The GPU is used to render, for pixels of the two-dimensional set of pixels, depth values corresponding to the three-dimensional object orientation. The rendered depth values are compared to a stored set of depth values. The GPU generates a first score for the first proposed three-dimensional object orientation as a function of comparison of the rendered depth values to depth image data received on the data input. These steps are also implemented for a second proposed three-dimensional object orientation to produce a second score. One of the proposed object orientations is then selected as a function of the first score and the second score.

Particular embodiments relate to parallelization of many or all of the above steps to score and select between a large number of candidate object orientations.

Figure 4:
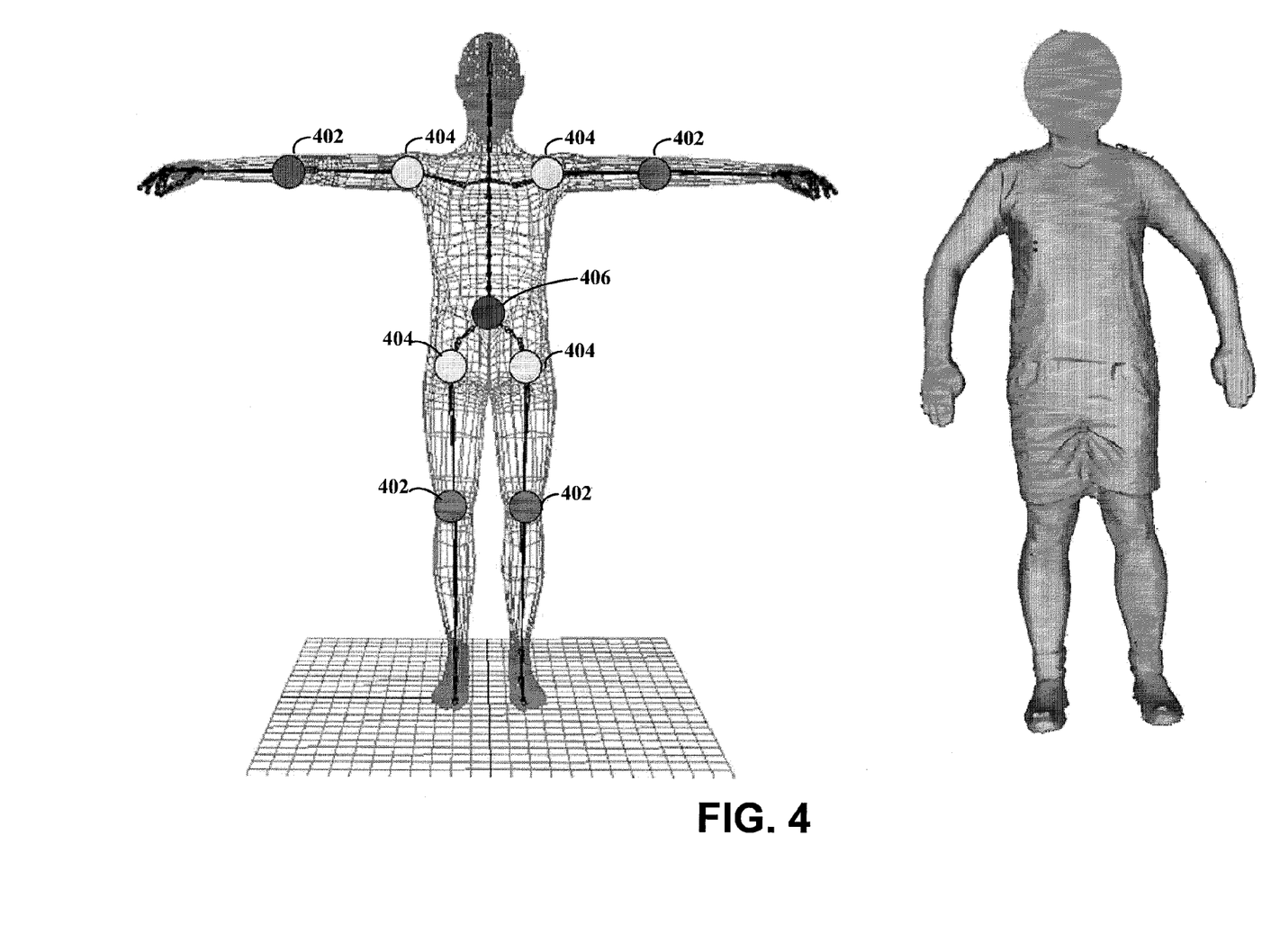
FIG. 4 depicts a mesh and related joints useful for generation of a model of a structure, consistent with an embodiment of the present disclosure.

FIG. 4 depicts a mesh and related joints useful for generation of a model of a structure, consistent with an embodiment of the present disclosure. Consistent with one implementation, a 3D articulated body was tracked from the depth data using a subject-specific 3D mesh. An example mesh was produced by applying quadric edge decimation to the output of a laser scanner and consists of 6000 vertices. Joint locations can be determined, for instance, by fitting the Shape Completion and Animation of People (SCAPE) model to the laser scan. For further details on such modeling, reference can be made to SCAPE: Shape Completion and Animation of People, Anguelov et al., ACM Transactions on Graphics (TOG), Volume 24, Issue 3 (July 2005), Proceedings of ACM SIGGRAPH 2005, which is fully incorporated herein by reference.

In a particular implementation, the articulated body included 10 body parts (head-trunk, pelvis, two arms consisting of the bicep, forearm-hand, and two legs consisting of the thigh, lower-leg) and the 9 joints connecting these parts. This is a simplified version of the articulated body given by the SCAPE model. The model can be constrained such that the elbow/knee (402) are 1-DOF revolute joints, and that the shoulders/hips (404) are 3-DOF revolute joints, and that the trunk-pelvis joint (406) is a 1-DOF revolute joint allowing bending forward and backward.

Variations thereof are also possible. For instance, each joint could be allowed to move in any direction with certain directions having very little range of motion. This effectively mimics the absolute restrictions on movement, while still allowing for slight deviations. Another possibility includes allowing expanded (or complete) freedom of movement for joints but including a large scoring penalty for certain motions. A consideration for these and other variations relates to the resulting number of candidate poses. Increased freedom of movement may result in a large number of candidate poses, which may slow the process. This can be weighed against the available processing resources and/or the design constraints of the system.

Figure 5A:
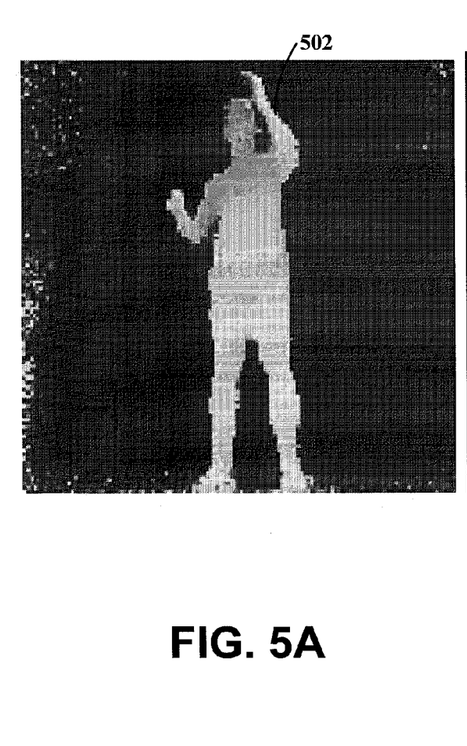
FIG. 5A depicts image data received from a depth-based image sensor, consistent with an embodiment of the present disclosure.

FIG. 5A depicts image data received from a depth-based image sensor, consistent with an embodiment of the present disclosure. The lightened areas show a human figure captured by the image sensor. The figure is closer to the sensor than the background and thereby shows up as lighter than the background. The figure has a raised arm 502, which will be discussed relative to FIGS. 5B and 5C.

Figure 5B:
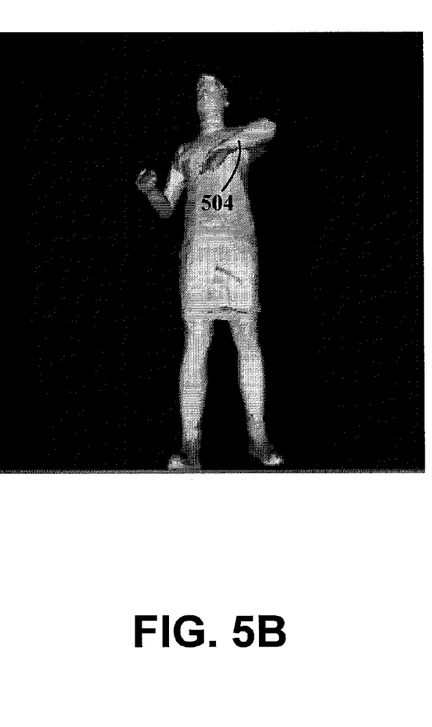
FIG. 5B depicts a candidate pose for a figure, consistent with an embodiment of the present disclosure.

FIG. 5B depicts a candidate pose for a figure, consistent with an embodiment of the present disclosure. The lightened area represents a modeling of the figure/human generated from a particular candidate pose for the figure. In particular, the candidate pose places arm 504 in a position in front of the torso of the figure. This position does not match the position of the arm that is depicted by the depth-based image sensor.

Figure 5C:
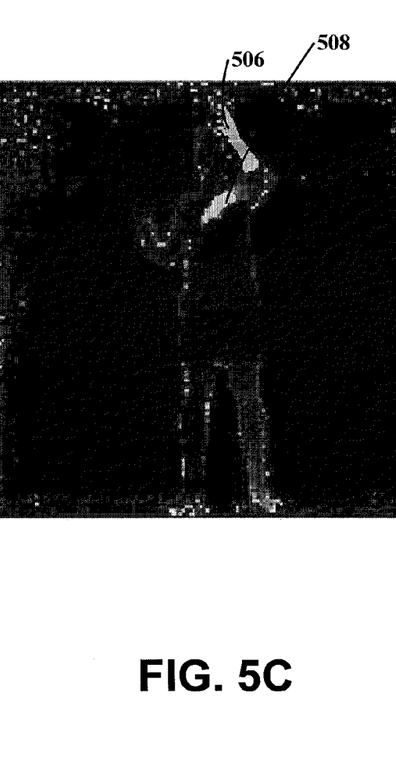
FIG. 5C depicts a representation of a depth-difference scoring, consistent with an embodiment of the present disclosure.

FIG. 5C depicts a representation of a depth-difference scoring, consistent with an embodiment of the present disclosure. The lightened areas show pixels that exhibit a large differential between the image sensor data and the modeling of the figure. In particular, areas 506 and 508 represent a difference between the raised arm 502 of the sensor image and the lowered arm 504 of the candidate pose.

Figure 6A:
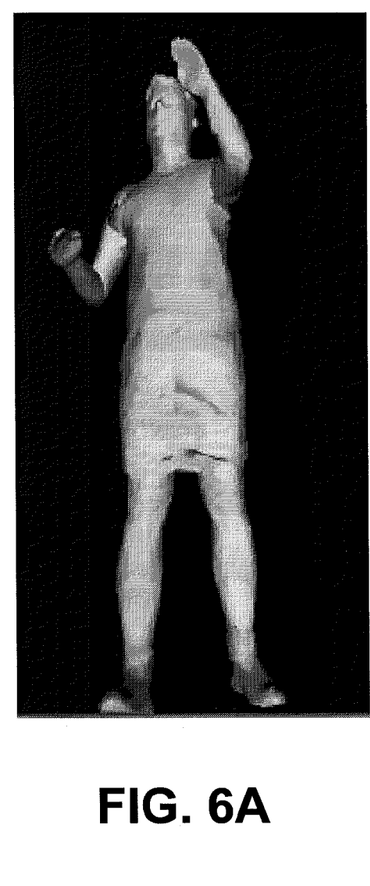
FIG. 6A depicts a modeled image for a candidate pose, consistent with an embodiment of the present disclosure.

FIG. 6A depicts a modeled image for a candidate pose, consistent with an embodiment of the present disclosure. This modeled image was generated with constraints on relative positions of the various body parts and joints maintained according to realistic human anatomy.

Figure 6B:
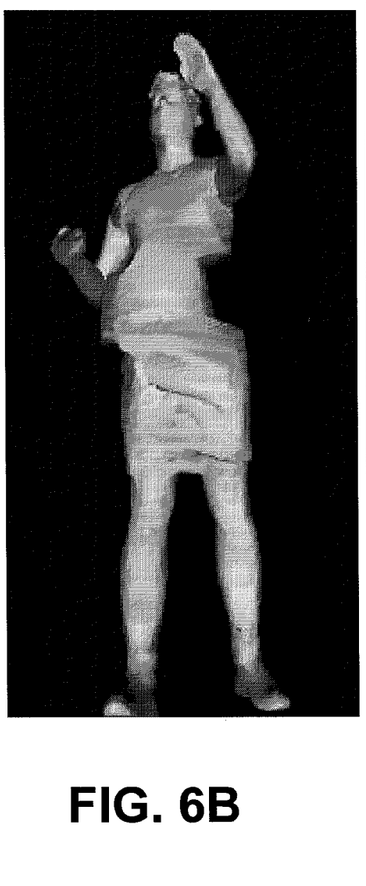
FIG. 6B depicts a modeled image for a candidate pose in which pelvis-torso constraints have been relaxed, consistent with an embodiment of the present disclosure.

FIG. 6B depicts a modeled image for a candidate pose in which pelvis-torso constraints have been relaxed, consistent with an embodiment of the present disclosure. As shown in the figure, relaxing constraints between the pelvis and torso can result in an unnatural position for the generated model. Notwithstanding, aspects of the present disclosure recognize that such relaxation can be useful for selection of a candidate pose. For instance, relaxation of constraints can help reduce or avoid trapping the algorithm in a local minimum.

Figure 6C:
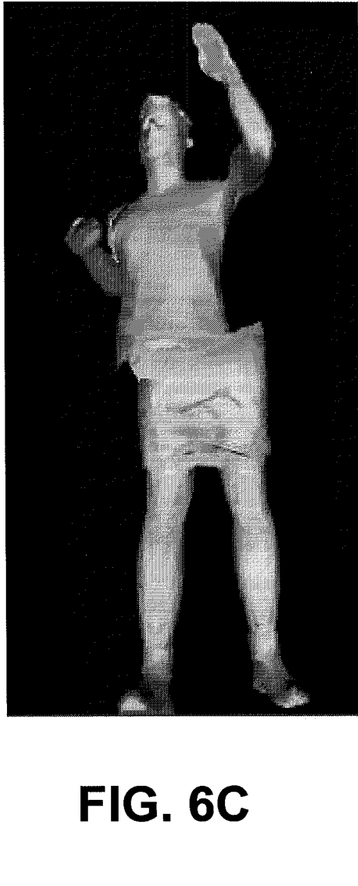
FIG. 6C depicts a modeled image for a candidate pose in which torso-limb constraints have been relaxed, consistent with an embodiment of the present disclosure.

FIG. 6C depicts a modeled image for a candidate pose in which torso-limb constraints have been relaxed, consistent with an embodiment of the present disclosure. As shown in the figure, relaxing constraints between the torso and limbs can result in an unnatural position for the generated model. Notwithstanding, aspects of the present disclosure recognize that such relaxation can be useful for selection of a candidate pose. For instance, relaxation of constraints can help reduce or avoid trapping the algorithm in a local minimum.

Figure 7:
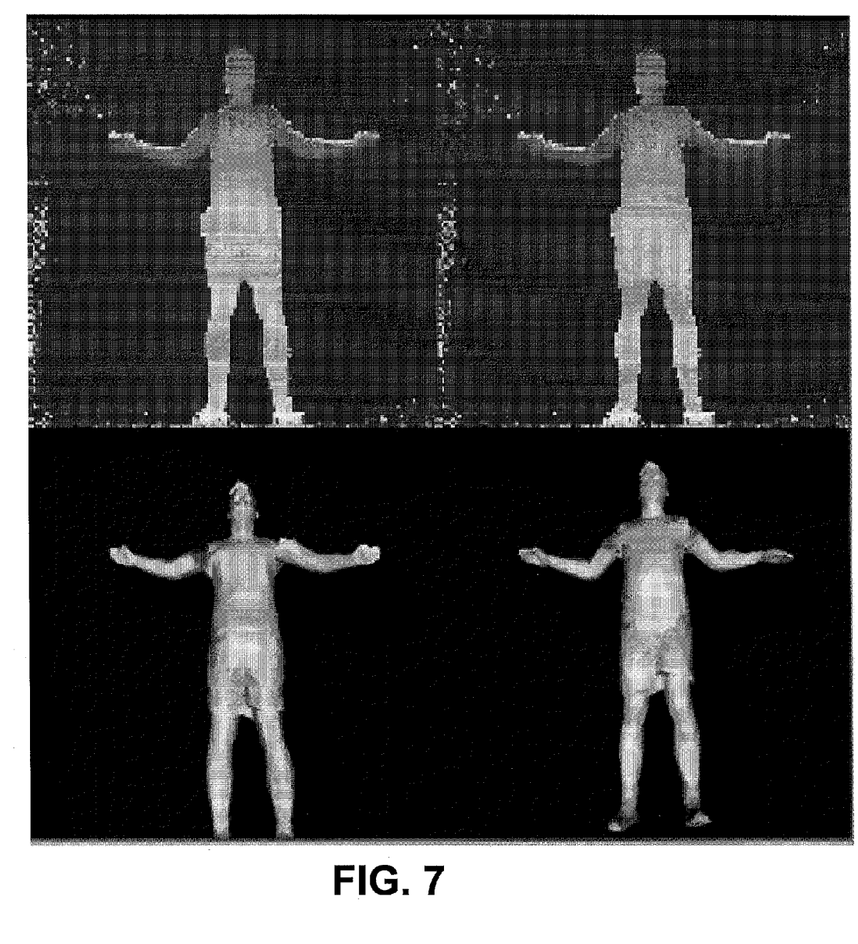
FIG. 7 depicts the results of modeling the corresponding image data using relaxed constraints, consistent with an embodiment of the present disclosure.

FIG. 7 depicts the results of modeling the corresponding image data using relaxed constraints, consistent with an embodiment of the present disclosure. The top two images represent depth-based image data of a structure/human. The bottom two images represent corresponding models generated by selecting candidate poses using relaxed constraints. As shown, the limbs are tracked relatively well in both images.

Figure 8:
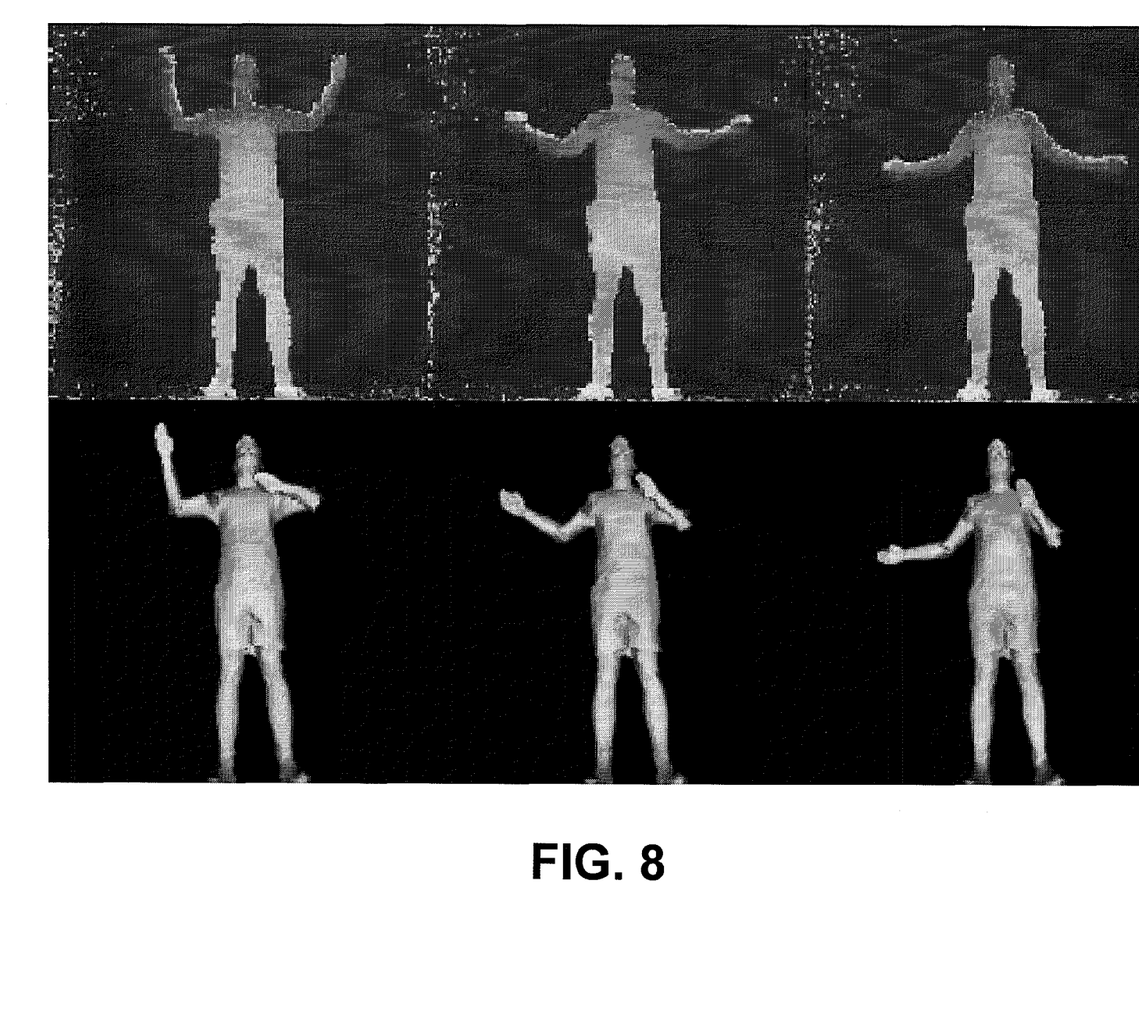
FIG. 8 depicts the results of modeling the corresponding image data without using relaxed constraints, consistent with an embodiment of the present disclosure.

FIG. 8 depicts the results of modeling the corresponding image data without using relaxed constraints, consistent with an embodiment of the present disclosure. The top two images represent depth-based image data of a structure/human. The bottom two images represent corresponding models generated by selecting candidate poses that do not use relaxed constraints. As shown, the left arm of the person is incorrectly modeled as being in front of another portion of the model. This can be attributed to an incorrect local minimum caused by the large cost associated with placing the arm in front of the background. Thus, the scoring suggests that improvement is not gained by moving the arm away from the body, despite the true location of the arm being so located.

A variety of components form aspects of the present disclosure and related methods and algorithms. These aspects can be used in various combinations and with a variety of modifications without departing from the spirit of the present disclosure. The following discussion provides details regarding a few, such combinations. This discussion is not limiting and instead helps form a basis from which other variations and combinations can be implemented.

Embodiments of the present disclosure facilitate tracking of an articulated model M based on a sequence of the depth measurements. The model M is represented as a set of vertices $v_i$, a set of rigid parts $p_1 \ldots p_p$, and a set of joints J. The depth measurement consists of a set of numbers $\hat{D}=\hat{d}_1 \ldots \hat{d}_k$ where k indexes the pixel in the image. For each frame in the sequence, the alignment T transforms the model points v into the camera frame of reference. The alignment $T=T_1, \ldots T_p$, specifies the transformation for each rigid part.

The observed $\hat{D}$ can be modeled as the result of corrupting the true depths at each pixel D with the sensor noise model, which can be assumed to be gaussian with mean D and variance $\sigma^2$. In one implementation, it can be assumed that D(T) are the depths generated by casting a ray through each pixel and finding the closest triangle in the model M transformed by the alignment T.

Therefore, assuming the prior distribution on T is uniform, the following objective can be derived to find the optimal alignment T*, where the notation T ∈ J is used to state that T is an alignment respecting the joint constraints.

$$l(T) \propto \left\| D(T) - \hat{D} \right\|_2^2$$

$$T^* = \underset{T}{\mathrm{argmin}}\, l(T) \text{ s.t. } T \in J$$

This energy function is generally in line with the generative model. Aspects of the present disclosure realize, however, that improvements can be made for good energy function when searching for the most likely pose. For instance, in order to find T*, l(T) is evaluated at several incorrect points. Since those incorrect poses may result in vertices of the body being incorrectly rendered outside the actual silhouette of the person in the measurement $\hat{D}$, a quadratic penalty is incurred for comparing the relatively small predicted depth measurement of the person against the huge depth value of the background (for instance, the back wall of the room). As a result, this energy function has undesirable property that poses close in terms of alignment to the correct pose nevertheless can have huge cost, whereas vastly incorrect poses that stay within the silhouette will have much lower cost.

Another aspect of the present disclosure relates to the realization that the local gradient can lead to the wrong local minima of the objective. For instance, if the arm is extended beyond the silhouette, the objective will be reduced by rotating the arm toward the background. This can result in the algorithm getting stuck in incorrect local minima.

The original model should explain errors with the sensor model. One possibility involves including the uncertainty of the vertices as part of the model. Aspects of the present disclosure realize, however, that such an implementation exhibits the odd behavior that the more certain the result, the worse the energy function.

Accordingly, the energy function can be modified to account for mis-correspondence. In this case, the algorithm assumes that depth measurements beyond a certain range can not correspond to any body part. Assuming that w represents the maximum expected range of the subject and that $\alpha$, $\beta$, and $\gamma$ are parameters of the energy function, then a cost per pixel is defined as:

$$c(x) = \gamma |x| + x^2$$

-continued $$l'_k(T) = \begin{cases} \alpha, & \text{if } d_k > w \text{ and } \hat{d}_k < w \\ \beta, & \text{if } d_k < w \text{ and } \hat{d}_k > w \\ c(d_k(T) - \hat{d}_k), & \text{otherwise} \end{cases}$$

The new energy function is then $$l'(T) = \sum_k l'_k(T)$$

Aspects of the present disclosure recognize that this algorithm is often not overly sensitive to $\alpha$, $\beta$, and $\gamma$ parameters. Accordingly, the parameters can be set to a constant value (e.g., 5). This objective penalizes both silhouette-violations and leaving pixels in the silhouette un-explained Various aspects use a combination of L1 and L2 penalties because L1 tries to push small errors all the way to 0 whereas L2 penalizes large errors. FIG. 5 illustrates the cost per pixel for an incorrect pose.

If it is assumed that an initial state T is present, T can be optimized by applying steepest ascent hill climbing. During each iterative step of the hill climbing, the current pose is replaced by the neighbor with highest value. Aspects of the present disclosure relate to mechanisms for defining a set of neighbor generating functions that work well. In certain implementations, this entire search procedure can be implemented on a GPU, which facilitates quick evaluation of the energy function and of the cost of neighbors in parallel.

In order to enforce the constraint that the T ∈ J, the process optimizes over θ which specifies the local transformations for each joint, and generates T from θ based on the kinematic chain.

A neighbor generating function is defined with an argument that is one or two real numbers that returns a new state relative to the current state. For example, one of the moves, $f(\phi_1, \phi_2)$ could represent rotation of a shoulder about an axis by $\phi_1$ and bends the corresponding elbow by $\phi_2$. This move is particularly useful for motion that involves simultaneous rotation of the shoulder and bending of the elbow, as optimizing each separately can be problematic, because these parameters are highly coupled. Table 1 lists an example set of moves.

TABLE 1

Neighbor Generating Functions

| Name | DOF | Description |
| --- | --- | --- |
| RotatePelvisAboutAxis | 1 | 3 moves rotating about x, y, z axes |
| TranslatePelvisAlongAxis | 1 | 3 moves translating along x, y, z axes |
| BendTorso | 1 | bends the torso by angle |
| RotateBendLimb | 2 | 12 moves, 4 limbs and 3 axes, enforces articulation |
| RelaxRotatePelvisAboutAxis | 1 | updates pelvis/torso but not others |
| RelaxTranslatePelvisAlongAxis | 1 | updates pelvis/torso but not others |

A recursive grid search optimizes the moves over their parameters. This search procedure samples a set of equally spaced grid points in N dimensions, picks the smallest point x*, and then samples a finer spaced grid centered at x*, which is repeated for some number of levels. The optimization strategy is then parallelizable as follows:

---

Input: $\hat{d}_k$, θ
Input: θ*
foreach move do
| θ* = RecursiveGridSearch(move);
end Algorithm 1: FindBestPose

---

In a particular implementation, the Relax* moves update the alignment T only for the pelvis and torso, and leave the remaining transformations untouched, as shown in FIGS. 6A-C. The moves for limb enforce the articulation constraint, so that after the torso has been optimized, and moves for the limbs are tested, this causes the limbs to effectively pop back to the new location of the torso.

When applying the moves for limbs, all (or nearly all) possible orders can be tried. Those moves that result in the best final outcome can be kept. This relatively exhaustive application of moves can be particularly useful for accounting various situations such as where a person takes a step forward with the left leg when facing the side. If the right leg is optimized first, it might incorrectly explain the new position of the left leg, thereby falling into an incorrect local minima. In certain implementations, the orientation and twist of the limbs is constrained to operate within human limits, although this constraint is optional as the impact on performance is often negligible.

An experimental implementation on a set of 15 different sequences each consisting of about 20-60 frames spanning a range of motions containing out-of-plane rotations, lower and upper body movement and occlusion was undertaken. Each system was (approximately) initialized to the correct pose at the start of each sequence. Manual labeling determined whether the system was at the right pose at the end of the sequence and if it seemed to track accurately during the sequence.

Experimental testing was performed using an algorithm consistent with the present disclosure on six different sequences. Many of the six sequences featured out-of-plane rotation that was successfully tracked. Such out-of-plane rotation can be quite difficult for monocular systems. The testing of the sequences also recovered from gross errors. In a particular implementation, the modeled leg incorrectly went backward. It is likely that the error may have been due to the foot being incorrectly rotated in a previous frame, which meant that it rotated backward to explain a sideways rotation. In subsequent frames, the modeled leg recovered to the correct pose.

The temporary relaxation of the constraints in the algorithm can be particularly useful for correctly modeling various motions. For instance, without such relaxation, the entire body can be incorrectly moved in an attempt to explain the movement of limbs, whereas the relaxation can provide more accurate positioning of the body.

Evaluations of the benefit of relaxing the articulation constraint between the torso and limbs suggest that the relaxation method facilitates tracking in many sequences, and in particular in harder sequences that exhibit rotations of the body with simultaneous limb movements.

In terms of speed, a system consistent with the present disclosure evaluates many candidate moves per frame. This can take several seconds for an implementation that tries one move at a time and has to repeatedly send the moves to a GPU and then retrieve the resulting score. Aspects of the present disclosure realize that some, most or all of the moves can be prestored on the GPU. This is possible because each of the moves is a relative move. Such an implementation can be particularly useful for increasing the speed of the algorithm, e.g., by reducing accesses to the GPU and/or by increased parallelization of the scoring.

In a particular implementation, such as implementations consistent with various ones of the experimental test results, full body movement was captured using a marker-less motion capture system and the Time-of-Flight (ToF) sensor simultaneously. The markerless motion capture system consisted of eight Basler VGA color cameras synchronously capturing images at 75 fps. The ToF camera was a Swissranger SR3000 which recorded intensity and depth at 20 fps and a resolution of 176×144 pixels. Internal and external calibration parameters and a common frame of reference were established through offline processing.

According to an embodiment of the present disclosure, input data of the subject is taken prior to video-recording human performances. This can be achieved for example, by a full-body laser scan of the subject in its current apparel by means of a Vitus Smart™ laser scanner.

The various embodiments as discussed herein may be implemented using a variety of structures and related operations and functions. For instance, while many of the descriptions herein may involve software or firmware that plays a role in implementing various functions, various embodiments are directed to implementations in which the hardware includes all necessary resources for such adaptation, without necessarily requiring any involvement of software and/or firmware. Also, various descriptions herein can include hardware having a number of interacting state machines. Moreover, aspects of these and other embodiments may include implementations in which the hardware is organized into a different set and/or number of state machines, including a single state machine, as well as random-logic implementations that may not be clearly mapped to any number of finite-state machines. While various embodiments can be realized via hardware description language that is computer-synthesized to a library of standard modules, aspects of the invention should also be understood to cover other implementations including, but not limited to, field-programmable or masked gate arrays, seas of gates, optical circuits, board designs composed of standard circuits, microcode implementations, and software- and firmware-dominated implementations in which most or all of the functions described as being implemented by hardware herein are instead accomplished by software or firmware running on a general- or special-purpose processor. These embodiments may also be used in combination, for example certain functions can be implemented using programmable logic that generates an output that is provided as an input to a processor.

Various embodiments described above, in connection with the figures, with the example verifications, proofs, algorithms and otherwise, may be implemented together. For example, the example algorithms and other description may be implemented in connection with one or more of the figures. One or more of the elements depicted in the drawings/figures can also be implemented in a more separated or integrated manner, or removed, as is useful in accordance with a particular application. It is also within the spirit and scope to implement a program or code that can be stored in a machine-readable medium to permit a computer to perform one or more aspects of the approaches described above. Other variations relate to the use of programmable logic and/or discrete logic to perform one or more of the functions discussed herein. These methods can be used to supplement and/or exceed the capabilities of marker-based optical capturing systems (as applicable for example to the movie (special effects and otherwise) and computer game industry), and can be useful for animators and CG artists by providing a high level of flexibility in acquiring and modifying real-world content. It will be understood by those skilled in the relevant art that the above-described implementations are merely exemplary, and many changes can be made without departing from the true spirit and scope of the present disclosure. Therefore, it is intended by the appended claims to cover all such changes and modifications that come within the true spirit and scope of this disclosure.

What is claimed is:

1. A system for determining three-dimensional representations of at least one object from an input depth-based image, the system comprising:
   a processing circuit including a parallel graphical processing unit configured and arranged to
   determine a plurality of proposed three-dimensional object orientations for the at least one object based on an initial state of the at least one object that represents a current pose for the at least one object in the input depth-based image;
   render a plurality of depth-based images in respective orientations, each orientation corresponding to one of the plurality of proposed three-dimensional object orientations for the at least one object, by rasterizing each proposed three-dimensional object orientation to provide a set of two-dimensional image data, assessing occlusion of each set of two-dimensional image data to provide a set of two-dimensional pixels, and rendering, for pixels of the set of two-dimensional pixels, depth values corresponding to the three-dimensional object orientation;
   assess orientations from the plurality of orientations as a function of the rendered depth-base images and input depth-based image, by comparing each of the rendered depth-based images to the input depth-based image;
   score first and second ones of the proposed three-dimensional object orientations as a function of the comparison of the rendered depth values to the input depth-based image; and
   select an orientation from the plurality of proposed three-dimensional object orientations as a function of the assessment of orientations from the plurality of proposed orientations and the scoring.

2. The system of claim 1, wherein the processing circuit is a parallel processing circuit configured and arranged to determine the plurality of proposed orientations for the at least one object by applying different sets of relative moves to an initial state of a model of the at least one object that represents the current pose for the at least one object, and to render the plurality of depth-based images in parallel by accessing relative moves that are pre-stored in the parallel processing circuit and generating a plurality of images of the object from the input depth-based image.

3. The system of claim 1, wherein the processing circuit is a parallel processing circuit arranged to render the plurality of depth-based images in parallel and to assess orientations from the plurality of images against the input depth-based image in parallel.

4. The system of claim 1, further including a sensor input for receiving the input depth-based image for a scene that includes the at least one object.

5. The system of claim 4, wherein the graphical processing unit is further configured to perform the step of producing the first score by adjusting for large comparison differences due to one of the proposed three-dimensional object orientations including a portion that is outside of a silhouette of the object in the input depth-based image provided within the depth image data received on the sensor input.

6. The system of claim 4, wherein the graphical processing unit is further configured to generate each proposed three-dimensional object orientation from a set of moves about joints of the object.

7. The system of claim 4, wherein the graphical processing unit is further configured to generate each proposed three-dimensional object orientation from a set of moves about joints of the object, wherein the joints are subject to a set of movement constraints that are relaxed for at least one proposed three-dimensional object orientation.

8. The system of claim 4, wherein the graphical processing unit is further configured to perform the step of producing a first score by weighting depth violations outside of an expected depth range for the three-dimensional object, the respective depth values including a numerical value corresponding to a three-dimensional orientation of the object.

9. The system of claim 4, wherein the proposed three-dimensional object orientations are constrained according to a set of movement constraints for joints of the three-dimensional object.

10. The system of claim 4, wherein the graphical processing unit is further configured to perform the step of storing and selecting a proposed three-dimensional object orientation for a plurality of additional proposed three-dimensional object orientations.

11. The system of claim 4, wherein the graphical processing unit is further configured to perform the step of storing and selecting in parallel for each of the proposed three-dimensional object orientations.

12. A method for providing motion capture of a structure using a processing circuit, the method comprising:
  determining a plurality of proposed three-dimensional object orientations for at least one object in an input depth-based image based on an initial state of the at least one object that represents a current pose for the at least one object in the input depth-based image;
  using a processing circuit including a parallel graphical processing unit to render a plurality of depth-based images from a plurality of moves relative to the current pose for the structure depicted in the input depth-based image and a three dimensional model of the structure, by rasterizing each proposed three-dimensional object orientation to provide a set of two-dimensional image data, assessing occlusion of each set of two-dimensional image data to provide a set of two-dimensional pixels, and rendering, for pixels of the set of two-dimensional pixels, depth values corresponding to the three-dimensional object orientation;
  assess relative moves of the structure from the plurality of moves against the input depth-based image by comparing aspects of the rendered depth-based images to the input depth-based image;
  score first and second ones of the proposed three-dimensional object orientations as a function of the comparison of the rendered depth values to the input depth-based image; and
  select a relative move from the plurality of relative moves as a function of the assessment of relative moves and the scoring.

13. The method of claim 12, wherein the parallel graphical processing unit includes parallel processing hardware, wherein using the processing circuit to render the plurality of depth-based images includes applying the plurality of moves relative to the current pose for the three dimensional model of the structure and generating depth-based images of the structure in the input depth-based image, and wherein the relative moves describe movement of the structure about one or more joints and are stored in a first memory local to parallel processing hardware of the processing circuit; the method further including the steps of:
  accessing, in a second memory local to the parallel processing hardware, two-dimensional input pixel data that includes depth values for pixels of the two-dimensional pixel data;
  rasterizing, within the parallel processing hardware, a set of two-dimensional pixel representations based upon the three dimensional model and a first subset set of moves of the plurality of relative moves;
  comparing depth values for the set of two-dimensional pixel representations to the depth values for the two-dimensional input pixel data;
  selecting a first move in response to the depth value comparison;
  selecting a second subset of moves as a function of the first selected move;
  repeating the steps of rasterizing and comparing for the second subset of moves; and
  selecting a second move from the second subset of moves in response to the repeated steps.

14. The method of claim 13, further including the step of developing a grid of the plurality of relative moves as a function of rotational axis points for the three dimensional model.

15. The method of claim 13, further including the step of developing a grid of the plurality of relative moves as a function of rotational axis points for the three dimensional model and wherein selection of the second subset includes selection of moves based upon move location within the grid and relative to a location of the first selected move within the grid.

16. The method of claim 13, wherein selecting a second subset of moves as a function of the first selected move includes
  determining rates of change for a score, the rates of change being relative to changes from the first selected move, and
  selecting a relative change with a rate of change that improves the score.

17. A method for providing motion capture of a structure in an input depth-based image using parallel processing hardware, the method comprising:
  determining a plurality of proposed three-dimensional object orientations for the structure based on an initial state of the structure that represents a current pose for the structure in the input depth-based image;
  accessing, in a memory local to the parallel processing hardware, a plurality of relative moves for a three dimensional model of the structure, the relative moves describing movement of the structure about a plurality of joints;
  accessing, in a memory local to the processing hardware, two-dimensional input pixel data for the structure in the input depth-based image that includes depth values for pixels of the two-dimensional pixel data;
  rasterizing, within the parallel processing hardware, each proposed three-dimensional object orientation to provide a set of two-dimensional pixel representations of the structure in the captured image data, based upon the three dimensional model and a first subset set of moves of the plurality of relative moves for a first set of joints of the plurality of joints, and upon occlusion of each set of two-dimensional pixel representations, and rendering, for pixels of the set of two-dimensional pixels, depth values corresponding to the three-dimensional object orientation;

comparing depth values for the set of two-dimensional pixel representations to the depth values for the two-dimensional input pixel data;

scoring first and second ones of the proposed three-dimensional object orientations as a function of the comparison of the depth values to the input depth-based image;

selecting a first move in response to the depth value comparison and the scoring;

selecting a second subset of moves as a function of a second set of joints of the plurality of joints;

repeating the steps of rasterizing and comparing for the second subset of moves; and selecting a second move from the second subset of moves in response to the repeated steps.

18. The method of claim 17, wherein accessing the plurality of relative moves includes accessing the moves as pre-stored in the memory, and the first set of joints corresponds to a joint describing movement of a torso of the three dimensional model of a structure.

19. The method of claim 17, wherein the second set of joints corresponds to at least one joint describing movement of a limb of the three dimensional model of a structure.

* * * * *